Nov. 17, 1936.  D. A. GARRETT  2,061,149
BAKING PROCESS
Filed June 10, 1935
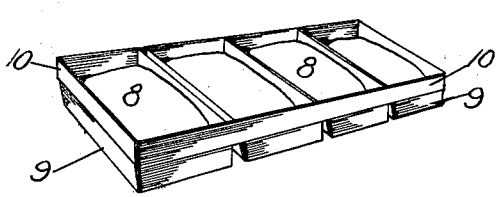
Fig. 1.
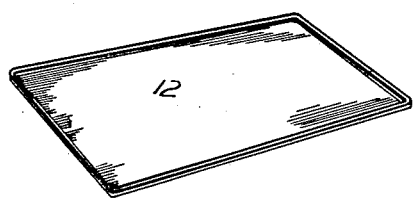
Fig. 2.
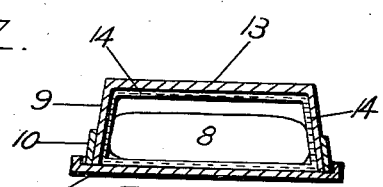
Fig. 5.
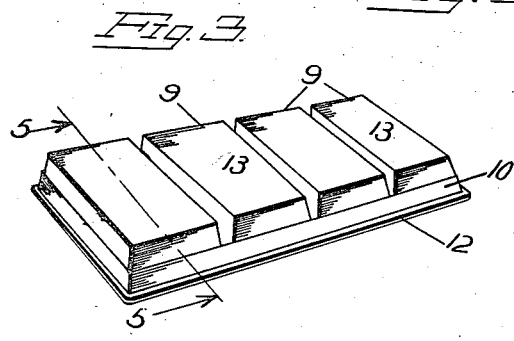
Fig. 3.
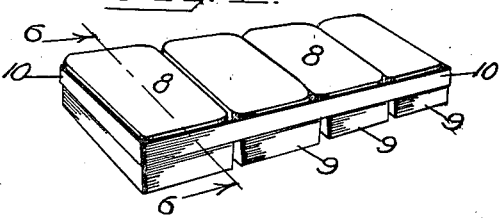
Fig. 4.
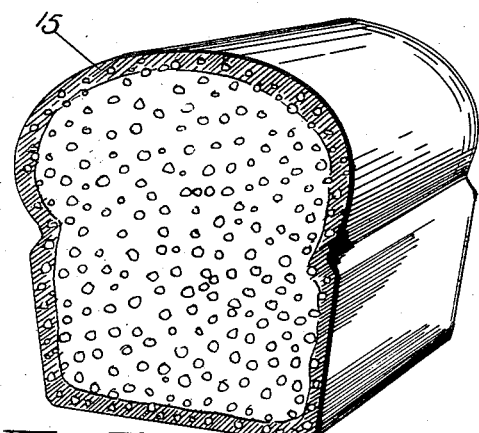
Fig. 7.
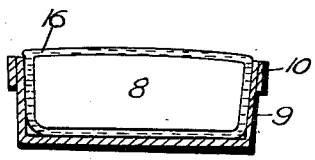
Fig. 6.
INVENTOR.
DURLAND A. GARRETT
BY
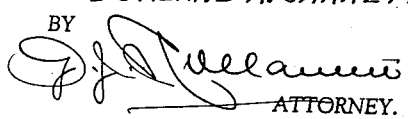
ATTORNEY.

Patented Nov. 17, 1936

2,061,149

UNITED STATES PATENT OFFICE 2,061,149

BAKING PROCESS

Durland A. Garrett, Boulder, Colo.

Application June 10, 1935, Serial No. 25,821

3 Claims. (Cl. 107—54)

My invention relates to a baking process and more particularly to methods of preparing dough for baking, and it has for its object, the production of bread having a crust of uniform color and consistency on all its sides, and of a porous and crisp quality which facilitates breaking or cutting.

Another object of my invention is to control the direction of travel of gases in the dough when it is rising and during a portion of the baking stage, whereby bread of a smooth, even texture is produced.

A further object of the invention is to reduce the time required in the proofing stage of bread making and thereby simplify bread making.

A still further object of the invention is to eliminate humidity control of the type required under present practice during the proofing stage of bread making.

Other objects reside in novel steps and treatments as will more fully appear in the course of the following description.

In order to promote a better understanding of my invention, reference is made to the accompanying drawing which illustrates the several steps of my novel bread making method, and in which Figure 1 is a perspective view showing pieces of dough placed in baking pans at the completion of the forming operation;

Figure 2 is a perspective view of a tray which is covered with an edible vegetable oil;

Figure 3 is a perspective view showing the pans shown in Figure 1, inclusive of the pieces of dough, placed in an upside-down position on the tray illustrated in Figure 2;

Figure 4 is a perspective view of the pans and dough pieces in the upright position in which they are placed in a baking oven;

Figure 5 is an enlarged section taken along the line 5—5, Figure 3, with the oil film expanded for purposes of illustration;

Figure 6 is an enlarged section taken along the line 6—6, Figure 4, with the oiled layer of dough expanded for purposes of illustration; and Figure 7 is a perspective view of a cut-away portion of a loaf of bread after baking.

The process may be practiced in producing various types of bread, such as white bread, whole wheat bread, rye bread, rolls of various types, including a plurality of pieces of dough formed as a unit, or the like.

In the drawing in the several views of which corresponding parts have been similarly designated, the reference numeral 8 indicates a piece of dough formed in the usual way by mixing the various ingredients, inclusive of yeast, kneading the mixture and shaping as desired. The dough 8 is placed in a pan 9, which preferably has been first coated with an edible oil. Corn oil has been found entirely satisfactory, but it is to be understood that other edible vegetable oils such as wheat oil may be employed in practicing the invention.

In commercial baking it has been found advantageous to place a plurality of baking pans 9 in a frame 10, where they are held against relative movement, permitting handling as a unit, and this practice has been illustrated in the drawing.

A tray 12, preferably of a size sufficient to permit its being superposed upon the several pans 9 held in frame 10, is also covered with an edible vegetable oil, and the pans containing the dough are next placed on the tray with their open sides down and permitted to remain in this position until the loaves have reached the proper proof.

It will be understood that while the dough is proofing, it is confined on every side, and therefore, the amount of expansion which may be attained, is limited.

During the proofing step, the gases of fermentation travel upwardly, and because the pans 9 have been reversed and because the dough does not contact the bottom of the pan at the beginning of the proofing, the direction of travel of these gases is toward the bottom 13 of each pan.

After the loaves have attained the desired proof, the pans 9 are placed in an oven in the position shown in Figure 4. As soon as the dough 8 is placed in this position, the gases of fermentation travel upwardly, in a direction opposed to their courses during the proofing step.

By reversing the position of the dough in the manner described, a definite control of the formation of the cell structure of the loaf is attained. The time during which the loaf remains in each position determines the size and shape of the cell structure. By employing the method set forth herein, the time required for proofing can be reduced twenty-five to thirty per cent, and when proofing is so reduced, the gases travel in one direction about the same length of time they travel in the reverse direction.

The cells produced by this process are substantially round and not oblong, as in present practice, and as a result, the bread, when the baking is completed, has a finer, more even texture than can be attained by present practice.

During the proofing step, the dough 8 comes in contact with the film of edible oil 14 on the pans 9 and tray 12, and a considerable quantity of this edible oil is absorbed by the dough, forming an oil-containing layer 16 all around the loaf.

Proofing the loaf with the pan 9 on top also prevents the dough from adhering to the pan, and as a result there is no tendency for moisture to collect between the pan and the loaf, as frequently occurs in present practice. For this reason it is not absolutely essential that the pans 9 be oiled, but the use of edible oil on tray 12 or in some equivalent manner of application is an essential where a crisp crust is to be produced. In this connection it will be understood that the use of oil does not affect the control of the cell structure, as hereinbefore described.

When the loaf is baked, the oiled layer 16 on the dough expands and forms a porous crust 15, (Figure 7) which is readily broken or cut, and which possesses an attractive flavor, in addition. This crust is of substantially uniform quality on all sides of the loaf.

In present baking practice, it is necessary to control humidity during proofing to prevent the formation of an undesirable crust on the unbaked dough. When the present invention is practiced, the dough is not exposed to the atmosphere during proofing and the dough creates its own humidity, thereby rendering special humidity control unnecessary. An additional advantage is derived from practicing this invention, in that gases of fermentation are not permitted to escape during proofing and the full flavor is thereby retained in the dough.

Because of the compact character of the dough at the completion of the proofing step of the process, a larger expansion during baking is attained than is possible under present practice, and the baked loaf is of a light, smooth texture that is highly desirable in the baking art.

In describing the invention, reference has been made to yeast as the fermentation product of the dough. It will be clear to any one skilled in the art, that where desired, other gas-emitting products of the type used in baking, may be employed within the spirit and scope of the invention.

While specific trays and pans have been illustrated in the drawing and are efficacious in performing the several steps of the process, it is to be understood that such devices are not essential in practicing the invention, and satisfactory results may be attained whenever the steps of proofing and baking as herein described are practiced.

Changes and modifications may be availed of within the spirit and scope of the invention as defined in the hereunto appended claims.

Having described the invention, what is claimed as new is:

1. The method comprising forming a loaf of dough containing a fermentation agent in a closed vessel having an expansion space only above the dough space, said dough being confined in the vessel to cause the proofing gases to move towards the expansion space, proofing said loaf, reversing the position of the dough loaf in the vessel after proofing, and baking while causing the gases of fermentation to travel through the loaf in a direction opposite to the direction of travel of the proofing gases during proofing, the period of time in which the gases travel in one direction during proofing being approximately equal to the period of time in which the gases travel in the opposite direction during baking.

2. The method of producing bread and the like which comprises forming a loaf of dough containing a fermentation agent, confining the loaf of dough in a closed vessel with an expansion space for the dough only above the space occupied by the same, proofing the dough while so confined to cause the proofing gases to move toward the expansion space, reversing the position of the dough loaf in the vessel after proofing, and baking the loaf while in the reversed position to thereby cause the gases of fermentation to travel through the loaf in a direction opposite to the direction of travel of the proofing gases during proofing, the period of travel of the fermentation gases in one direction through the loaf being at least equal to the period of travel of the proofing gases in the opposite direction through the loaf.

3. The method of producing bread and the like which comprises forming a loaf of dough containing a fermentation agent, confining the loaf of dough in a closed vessel with an expansion space for the dough only above the space occupied by the same, proofing the dough while so confined and while in contact with an edible oil on its lowermost surface thereof to cause the proofing gases to move toward the expansion space, and to cause a section adjacent the lowermost surface of the loaf to become saturated with edible oil, reversing the position of the dough loaf in the vessel after proofing, and baking the loaf while in the reversed position and while the remaining surfaces of the loaf are in contact with an edible oil to thereby cause the gases of fermentation to travel through the loaf in a direction opposite to the direction of travel of the proofing gases during proofing, the period of travel of the fermentation gases in one direction through the loaf being at least equal to the period of travel of the proofing gases in the opposite direction through the loaf in order to produce an edible loaf of uniform interior texture and crust.

DURLAND A. GARRETT.